United States Patent
Zhang et al.

(10) Patent No.: US 10,126,589 B2
(45) Date of Patent: Nov. 13, 2018

(54) VIRTUAL CURVED SURFACE DISPLAY PANEL, MANUFACTURING METHOD THEREOF, AND DISPLAY DEVICE

(71) Applicant: BOE TECHNOLOGY GROUP CO., LTD., Beijing (CN)

(72) Inventors: Can Zhang, Beijing (CN); Yafeng Yang, Beijing (CN); Jian Gao, Beijing (CN); Can Wang, Beijing (CN); Xinli Ma, Beijing (CN); Wei Wang, Beijing (CN); Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/569,415

(22) PCT Filed: Apr. 24, 2017

(86) PCT No.: PCT/CN2017/081620
§ 371 (c)(1),
(2) Date: Oct. 26, 2017

(87) PCT Pub. No.: WO2017/202162
PCT Pub. Date: Nov. 30, 2017

(65) Prior Publication Data
US 2018/0224695 A1 Aug. 9, 2018

(30) Foreign Application Priority Data
May 25, 2016 (CN) .......................... 2016 1 0353739

(51) Int. Cl.
*G02F 1/1335* (2006.01)
*G02B 3/00* (2006.01)
(Continued)

(52) U.S. Cl.
CPC ...... *G02F 1/133526* (2013.01); *G02B 3/0037* (2013.01); *G02B 27/0955* (2013.01);
(Continued)

(58) Field of Classification Search
CPC .... G02B 3/14; G02B 27/123; G02B 27/0955; G02B 3/0037; G02B 3/0006; G02B 3/0062; G02F 1/133526; G02F 1/133528
(Continued)

(56) References Cited

U.S. PATENT DOCUMENTS

| 5,098,184 A | * | 3/1992 | van den Brandt | ....... G02B 3/00 |
| | | | | 353/102 |
| 6,094,242 A | | 7/2000 | Yamanaka | |

(Continued)

FOREIGN PATENT DOCUMENTS

| CN | 101681023 A | 3/2010 |
| CN | 104575322 A | 4/2015 |

(Continued)

OTHER PUBLICATIONS

International Search Report in PCT Application No. PCT/CN2017/081620 dated Jul. 26, 2017.

*Primary Examiner* — Ricky Mack
*Assistant Examiner* — Kristina Deherrera
(74) *Attorney, Agent, or Firm* — Calfee, Halter & Griswold LLP

(57) ABSTRACT

A virtual curved surface display panel, a method of manufacturing the same, and a display device are provided. A set of vertical lenticular lens and horizontal lenticular lens fitted tightly and orthogonally is arranged on a light exit surface of a pixel in the flat display panel, which forms an equivalent spherical lens. The focal lengths of the equivalent spherical lenses are symmetrically distributed with a central pixel as a symmetry axis, and focal lengths of the equivalent spheri-
(Continued)

cal lenses in the columns located on the same side of the symmetry axis are not equal to each other. Therefore, the equivalent spherical lenses enable the images of the pixels to form a curved surface, thereby realizing virtual curved surface display.

20 Claims, 6 Drawing Sheets

(51) Int. Cl.
    *G02B 27/09*     (2006.01)
    *G02B 27/12*     (2006.01)
    *G02B 3/14*     (2006.01)

(52) U.S. Cl.
    CPC ...... *G02F 1/133528* (2013.01); *G02B 3/0006* (2013.01); *G02B 3/0062* (2013.01); *G02B 3/14* (2013.01); *G02B 27/123* (2013.01)

(58) Field of Classification Search
    USPC .................................................. 359/619–628
    See application file for complete search history.

(56) References Cited

U.S. PATENT DOCUMENTS

| | | | |
|---|---|---|---|
| 6,215,594 B1 * | 4/2001 | Inoguchi | G02B 27/2214 |
| | | | 359/619 |
| 2008/0018631 A1 | 1/2008 | Hioki et al. | |
| 2010/0177113 A1 | 7/2010 | Gay et al. | |
| 2016/0187745 A1 | 6/2016 | Jin | |

FOREIGN PATENT DOCUMENTS

| | | |
|---|---|---|
| CN | 204758851 U | 11/2015 |
| CN | 105807481 A | 7/2016 |
| CN | 205787478 U | 12/2016 |

* cited by examiner

VIRTUAL CURVED SURFACE DISPLAY PANEL, MANUFACTURING METHOD THEREOF, AND DISPLAY DEVICE

RELATED APPLICATIONS

The present application is the U.S. national phase entry of the international application PCT/CN2017/081620, with an international filing date of Apr. 24, 2017, which claims the benefit of Chinese Patent Application No. 201610353739.X, filed on May 25, 2016, the entire disclosures of which are incorporated herein by reference.

TECHNICAL FIELD

The present invention relates to the field of display technology, and particularly to a virtual curved surface display panel, a manufacturing method thereof, and a display device.

BACKGROUND

The current surface display has been widely used since it can provide comfortable visual experience, realistic sense of immediacy, and good immersion effect.

In the prior art, in order to form the effect of the curved surface, it is necessary to adjust the flat display panel.

For example, in order to achieve curved surface display, usually a flat display panel is made first, then a curving process is performed to the edge of the flat display panel, finally a physical mechanical curved surface is formed. This will cause the deformation of the edge field, easily lead to issues such as light leakage and color display abnormality. In addition, since many modules within the flat display panel should have a flexible design, the product yield is very low, and the cost of the product will increase accordingly. Moreover, the cutting process for the curved surface display panel is complex, material waste is serious, and it is difficult to realize mass production, the realization is more complex.

SUMMARY

An object of the embodiment of the present invention is to provide a virtual curved surface display panel, a method of manufacturing the same, and a display device, which solve the problem that the conventional solution for curved surface display is apt to cause light leakage, color display abnormality and complicated realization.

The object of embodiment of the present invention is achieved by the following technical solutions.

An embodiment of the invention provides a virtual curved surface display panel. The virtual curved surface display panel includes: a flat display plane having a plurality of pixels arranged in a matrix, and a lens group arranged on a light exit surface of the flat display panel. The images of the plurality of pixels made by the lens group form a curved surface. The lens group includes: a plurality of sets of vertical lenticular lens and horizontal lenticular lens fitted tightly and orthogonally one-to-one corresponding to the plurality of pixels. An overlapping region of each set of vertical lenticular lens and horizontal lenticular lens fitted tightly and orthogonally covers a corresponding pixel. In a column of vertical lenticular lenses corresponding to a column of pixels, focal lengths of the respective vertical lenticular lenses are equal. In a row of vertical lenticular lenses corresponding to a row of pixels, focal lengths of the respective vertical lenticular lenses are symmetrically distributed with a central pixel as a symmetry axis, and focal lengths of the respective vertical lenticular lenses located on the same side of the symmetry axis are not equal to each other. In each set of vertical lenticular lens and horizontal lenticular lens fitted tightly and orthogonally, a focal length of the horizontal lenticular lens is equal to a focal length of the vertical lenticular lens.

In certain exemplary embodiments, a column of vertical lenticular lenses corresponding to a column of pixels are formed integrally.

In certain exemplary embodiments, the focal length of each vertical lenticular lens is larger than an object distance of the corresponding pixel for imaging. In a row of vertical lenticular lenses, the focal length of the vertical lenticular lens increases gradually from the symmetry axis to a side edge.

In certain exemplary embodiments, an object distance of a pixel for imaging is larger than the focal length of a corresponding vertical lenticular lens and less than twice the focal length of the corresponding vertical lenticular lens. In a row of vertical lenticular lenses, the focal length of the vertical lenticular lens increases gradually from the symmetry axis to a side edge.

In certain exemplary embodiments, an aperture of a vertical lenticular lens is not less than a width of the corresponding pixel in the column direction, and/or, an aperture of a horizontal lenticular lens is not less than a width of the corresponding pixel in the row direction.

In certain exemplary embodiments, a refractive index of each horizontal lenticular lens is equal to a refractive index of a vertical lenticular lens fitted tightly and orthogonally with the horizontal lenticular lens. A curvature radius of each horizontal lenticular lens is equal to a curvature radius of a vertical lenticular lens fitted tightly and orthogonally with the horizontal lenticular lens. An arch height of each horizontal lenticular lens is equal to an arch height of a vertical lenticular lens fitted tightly and orthogonally with the horizontal lenticular lens. An aperture of each horizontal lenticular lens is equal to an aperture of a vertical lenticular lens fitted tightly and orthogonally with the horizontal lenticular lens.

In certain exemplary embodiments, the focal length of the vertical lenticular lens is $f=ab/(a+b)$. a represents an object distance of a pixel corresponding to the vertical lenticular lens for imaging, and b represents an image distance of the pixel corresponding to the vertical lenticular lens for imaging.

In certain exemplary embodiments, the curvature radius of the vertical lenticular lens is $r=ab(n-1)/(a+b)$. a represents an object distance of a pixel corresponding to the vertical lenticular lens for imaging, b represents an image distance of the pixel corresponding to the vertical lenticular lens for imaging, and n represents a refractive index of the vertical lenticular lens.

In certain exemplary embodiments, the arch height of the horizontal lenticular lens is $h=r-\sqrt{r^2-(p/2)^2}$. r represents the curvature radius of the vertical lenticular lens, and p represents the aperture of the vertical lenticular lens.

An embodiment of the invention further provides a display device including the virtual curved surface display panel according to any one of the above mentioned embodiments.

An embodiment of the invention further provides a method of manufacturing a virtual curved surface display panel. The method includes the following steps. Forming a flat display plane having a plurality of pixels arranged in a matrix. Forming a lens group including a plurality of sets of vertical lenticular lens and horizontal lenticular lens fitted tightly and orthogonally; wherein in a column of vertical lenticular lenses corresponding to a column of pixels, focal lengths of the respective vertical lenticular lenses are equal; wherein in a row of vertical lenticular lenses corresponding to a row of pixels, focal lengths of the respective vertical lenticular lenses are symmetrically distributed with a central pixel as a symmetry axis, and focal lengths of the respective vertical lenticular lenses located on the same side of the symmetry axis are not equal to each other; and wherein in each set of vertical lenticular lens and horizontal lenticular lens fitted tightly and orthogonally, a focal length of the horizontal lenticular lens is equal to a focal length of the vertical lenticular lens. Attaching the lens group on a light exit surface of the flat display panel; wherein an overlapping region of each set of vertical lenticular lens and horizontal lenticular lens fitted tightly and orthogonally covers a corresponding pixel so that images of the plurality of pixels made by the lens group form a curved surface.

In certain exemplary embodiments, the step of forming a lens group including a plurality of sets of vertical lenticular lens and horizontal lenticular lens fitted tightly and orthogonally includes: coating a whole layer of a lens imprinting plastic material on a first lens substrate and a second lens substrate respectively; imprinting a pattern of a plurality of vertical lenticular lenses on the first lens substrate coated with the lens imprinting plastic material by a first imprint mold, and imprinting a pattern of a plurality of horizontal lenticular lenses on the second lens substrate coated with the lens imprinting plastic material by a second imprint mold; performing a curing process to the first lens substrate imprinted with the pattern of the plurality of vertical lenticular lenses to form a plurality of vertical lenticular lenses, and performing a curing process to the second lens substrate imprinted with the pattern of the plurality of horizontal lenticular lenses to form a plurality of horizontal lenticular lenses; and performing a fitting process to the first lens substrate formed with the plurality of vertical lenticular lenses and the second lens substrate formed with the plurality of horizontal lenticular lenses so that each horizontal lenticular lens is fitted to a corresponding vertical lenticular lens tightly and orthogonally. In certain exemplary embodiments, the method further includes:

prefabricating the first imprint mold for forming the plurality of vertical lenticular lenses and the second imprint mold for forming the plurality of horizontal lenticular lenses.

In certain exemplary embodiments, the flat display panel includes an upper substrate and a lower substrate arranged oppositely. The plurality of pixels are located on the lower substrate. The lens group is located on a light exit surface of the upper substrate. An object distance of each pixel for imaging is a thickness of the upper substrate. The step of prefabricating the first imprint mold for forming the plurality of vertical lenticular lenses and the second imprint mold for forming the plurality of horizontal lenticular lenses includes: determining a curved surface to be formed with the images of the plurality of pixels; determining image distances of the plurality of pixels based on the curved surface; determining focal lengths of the plurality of pixels based on the image distances of the plurality of pixels and the thickness of the upper substrate; determining focal lengths of the respective sets of vertical lenticular lens and the horizontal lenticular lens fitted tightly and orthogonally and covering corresponding pixels based on the focal lengths of the plurality of pixels; and fabricating the first imprint mold based on the determined focal lengths of the respective vertical lenticular lenses, and fabricating the second imprint mold based on the determined focal lengths of the respective horizontal lenticular lenses.

An embodiment of the invention further provides a display method using the virtual curved surface display panel according to any one of the above mentioned embodiments. The display method includes: imaging the plurality of pixels using the plurality of sets of vertical lenticular lens and horizontal lenticular lens fitted tightly and orthogonally; wherein images of the plurality of pixels form a curved surface.

In the virtual curved surface display panel, method of manufacturing the same and display device provided by the embodiment of the present invention, a set of vertical lenticular lens and horizontal lenticular lens fitted tightly and orthogonally is arranged on a light exit surface of a pixel in the flat display panel, which forms an equivalent spherical lens. The focal lengths of the respective vertical lenticular lenses in a row corresponding to a row of pixels are symmetrically distributed with a central pixel as a symmetry axis, and focal lengths of the vertical lenticular lenses in the columns located on the same side of the symmetry axis are not equal to each other. Hence, the focal lengths of the equivalent spherical lenses are symmetrically distributed with a central pixel as a symmetry axis, and focal lengths of the equivalent spherical lenses in the columns located on the same side of the symmetry axis are not equal to each other. Therefore, the equivalent spherical lenses enable the images of the pixels to form a curved surface, thereby realizing virtual curved surface display. Compared with the prior art solution, it is unnecessary to perform a mechanical process to the flat display panel, thus there is no defect such as light leakage and color display abnormality in the flat display panel. In addition, the flexibility design for the flat panel display can also be reduced, and the implementation can thus be achieved simply.

DETAILED DESCRIPTION OF THE INVENTION

In the following, with reference to the accompanying drawings, the implementation of the virtual curved surface display panel, method of manufacturing the same and display device provided by the embodiment of the present invention will be described in detail.

An embodiment of the invention provides a novel solution for realizing virtual curved surface display, i.e., a virtual curved surface display panel. The virtual curved surface display panel includes: a flat display plane having a plurality of pixels arranged in a matrix, and a lens group arranged on a light exit surface of the flat display panel. The images of the plurality of pixels made by the lens group form a curved surface. The lens group includes: a plurality of sets of vertical lenticular lens and horizontal lenticular lens fitted tightly and orthogonally one-to-one corresponding to the plurality of pixels. An overlapping region of each set of vertical lenticular lens and horizontal lenticular lens fitted tightly and orthogonally covers a corresponding pixel. In a column of vertical lenticular lenses corresponding to a column of pixels, focal lengths of the respective vertical lenticular lenses are equal. In a row of vertical lenticular lenses corresponding to a row of pixels, focal lengths of the respective vertical lenticular lenses are symmetrically distributed with a central pixel as a symmetry axis, and focal lengths of the respective vertical lenticular lenses located on the same side of the symmetry axis are not equal to each other. In each set of vertical lenticular lens and horizontal lenticular lens fitted tightly and orthogonally, a focal length of the horizontal lenticular lens is equal to a focal length of the vertical lenticular lens.

The above solution will be described below with reference to the accompanying drawings.

Figure 1:
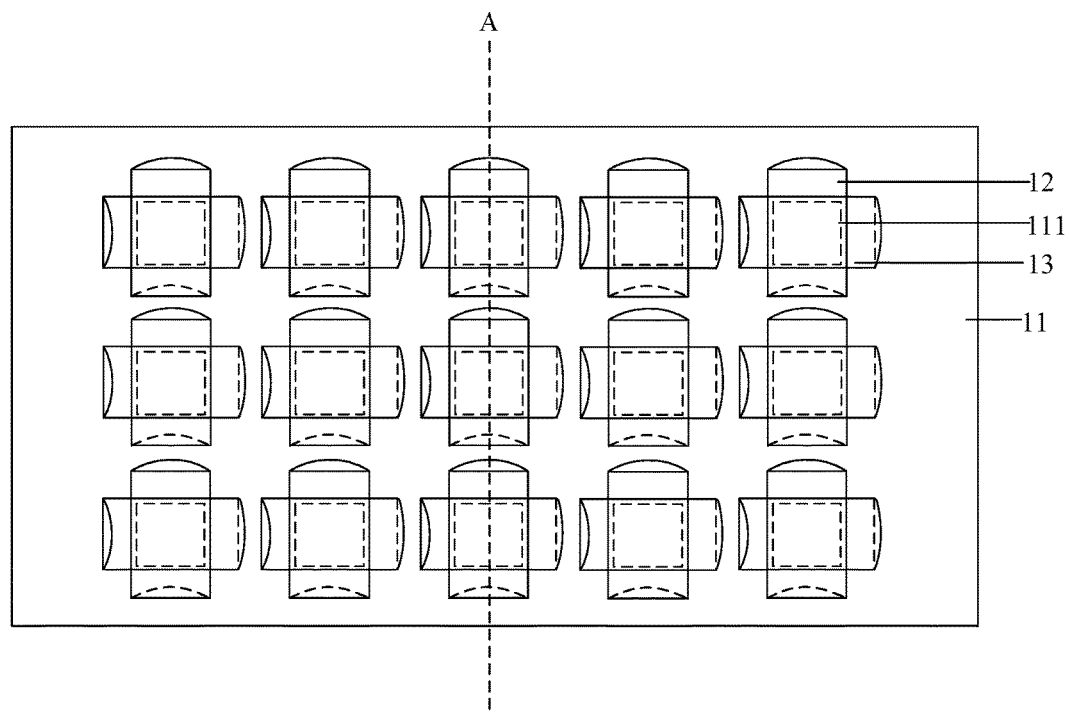
FIG. 1 is a structural schematic diagram of a virtual curved surface display panel according to an embodiment of the invention.

As shown in FIG. 1, an embodiment of the invention provides a virtual curved surface display panel. The virtual curved surface display panel includes: a flat display plane 11 having a plurality of pixels 111 arranged in a matrix, and a lens group arranged on a light exit surface of the flat display panel 11. The images of the plurality of pixels 111 made by the lens group form a curved surface. The lens group includes: a plurality of sets of vertical lenticular lens 12 and horizontal lenticular lens 13 fitted tightly and orthogonally one-to-one corresponding to the plurality of pixels 111. An overlapping region of each set of vertical lenticular lens 12 and horizontal lenticular lens 13 fitted tightly and orthogonally covers a corresponding pixel 111. In a column of vertical lenticular lenses 12 corresponding to a column of pixels 111, the focal lengths of the respective vertical lenticular lenses 12 are equal. In a row of vertical lenticular lenses 12 corresponding to a row of pixels 111, the focal lengths of the respective vertical lenticular lenses 12 are symmetrically distributed with a central pixel 111 as a symmetry axis (indicated with the dotted line A), and focal lengths of the respective vertical lenticular lenses 12 located on the same side of the symmetry axis are not equal to each other. In each set of vertical lenticular lens 12 and horizontal lenticular lens 13 fitted tightly and orthogonally, a focal length of the horizontal lenticular lens 13 is equal to a focal length of the vertical lenticular lens 12.

The horizontal lenticular lens 13 shown in FIG. 1 is located above the vertical lenticular lens 12.

Figure 2:
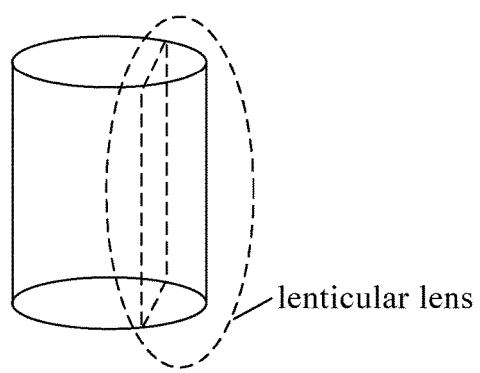
FIG. 2 is a structural schematic diagram of a lenticular lens according to an embodiment of the invention.
Figure 3:
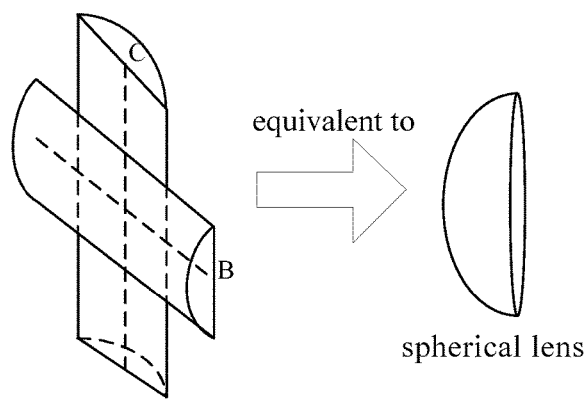
FIG. 3 is a structural schematic diagram of an equivalent spherical lens formed by two lenticular lenses fitted tightly and orthogonally according to an embodiment of the invention.

In the embodiment of the present invention, as shown in FIG. 2, the lenticular lens is a lens formed by cutting a cylinder. As shown in FIG. 3, two lenticular lenses with the same focal length are fitted tightly, and the axial directions (indicated with the dotted lines B and C) of these two lenticular lenses are orthogonal to each other. That is, these two lenticular lenses are fitted tightly and orthogonally, which can be equivalent to a spherical lens with a focal length equal to the focal length of these two lenticular lenses. The term "spherical lens" refers to a lens formed by cutting a sphere.

In the context of the present disclosure, the vertical lenticular lens refers to a lenticular lens of which the axial direction is arranged along a direction of a column of pixels, and the horizontal lenticular lens refers to a lenticular lens of which the axial direction is arranged along a direction of a row of pixels.

In the embodiment of the invention, a set of vertical lenticular lens and horizontal lenticular lens fitted tightly and orthogonally is arranged on a light exit surface of a pixel in the flat display panel, which forms an equivalent spherical lens. The focal lengths of the respective vertical lenticular lenses in a row corresponding to a row of pixels are symmetrically distributed with a central pixel as a symmetry axis, and focal lengths of the vertical lenticular lenses in the columns located on the same side of the symmetry axis are not equal to each other. Hence, the focal lengths of the equivalent spherical lenses are symmetrically distributed with a central pixel as a symmetry axis, and focal lengths of the equivalent spherical lenses in the columns located on the same side of the symmetry axis are not equal to each other. Therefore, the equivalent spherical lenses enable the images of the pixels to form a curved surface, thereby realizing virtual curved surface display. Compared with the prior art solution, it is unnecessary to perform a mechanical process to the flat display panel, thus there is no defect such as light leakage and color display abnormality in the flat display panel. In addition, the flexibility design for the flat panel display can also be reduced, and the implementation can thus be achieved simply.

In addition, the manufacturing process of the lenticular lens requires relatively low precision, and it is thus easy to manufacture the lenticular lens.

It should be noted that the number of the pixels in FIG. 1 is merely an example and does not represent the actual number of the pixels. If the number of pixels in a row is an odd number, the central pixel refers to a pixel in the center. If the number of pixels in a row is an even number, the central pixel refers to two pixels in the center. In FIG. 1, the number of pixels in a row is an odd number as an example.

Figure 4:
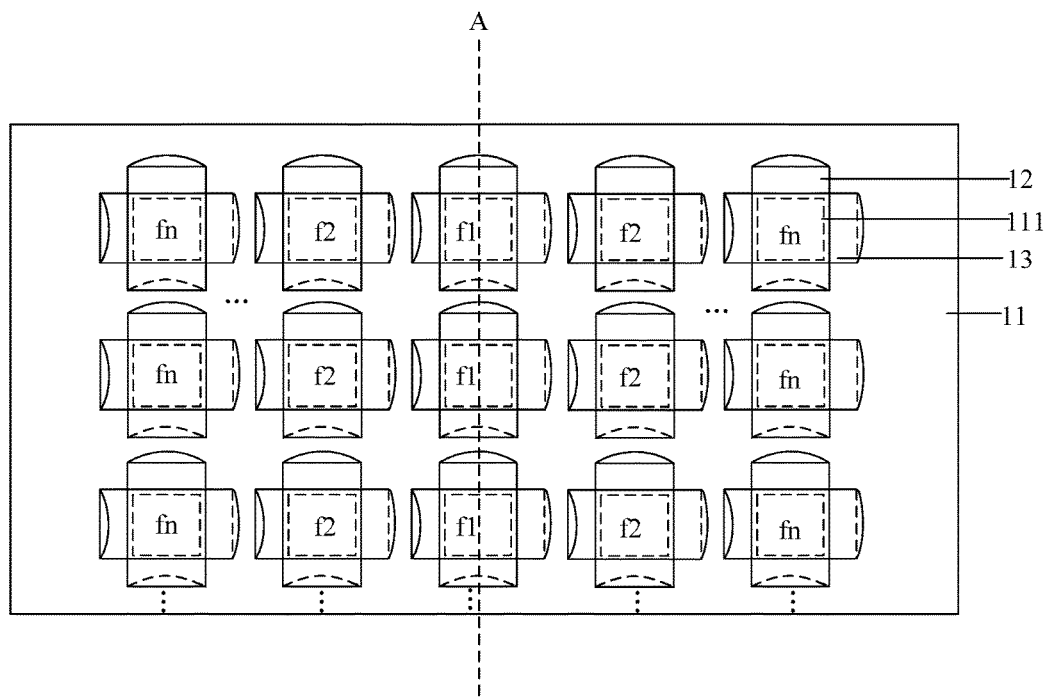
FIG. 4 is a schematic diagram showing the focal lengths of the vertical lenticular lenses in a virtual curved surface display panel according to an embodiment of the invention.

It is assumed that in a row of vertical lenticular lenses 12 corresponding to a row of pixels 111, the focal length of the vertical lenticular lens 12 corresponding to the central pixel is f1. In the schematic diagram of the focal lengths of the vertical lenticular lenses shown in FIG. 4, taking the central pixel as the symmetry axis, the focal lengths of the vertical lenticular lenses on the right side are f2, ..., fn respectively from left to right. The focal lengths of the vertical lenticular lenses on the left side are f2, . . . , fn respectively from right to left.

Figure 5:
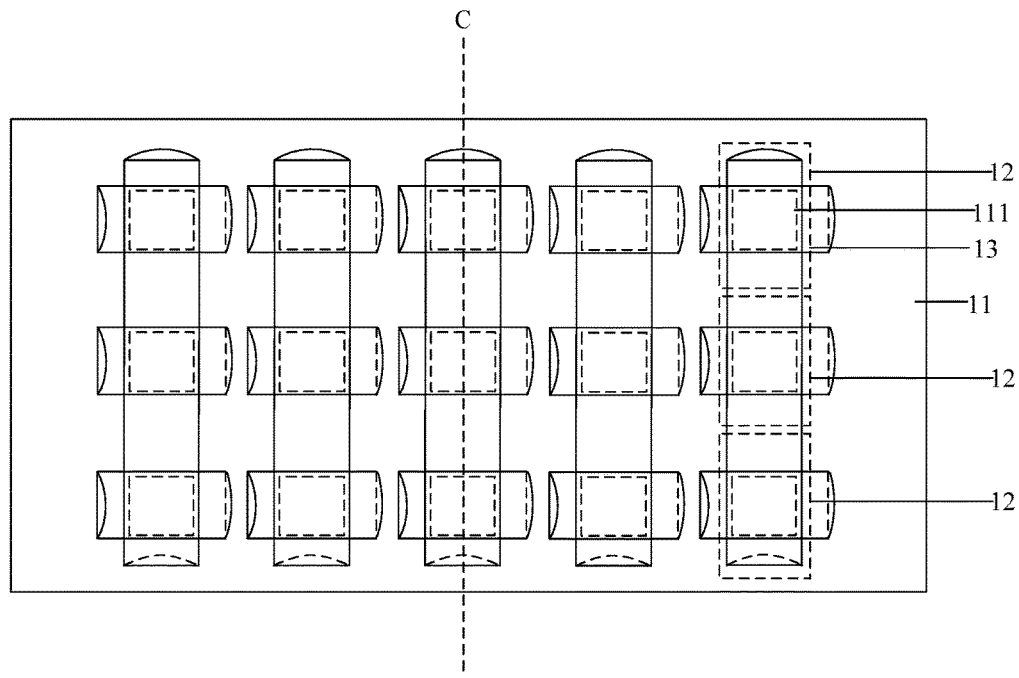
FIG. 5 is a structural schematic diagram of a virtual curved surface display panel according to another embodiment of the invention.

In a column of vertical lenticular lenses corresponding to a column of pixels, focal lengths of the respective vertical lenticular lenses are equal. For simplicity, optionally, a column of vertical lenticular lenses corresponding to a column of pixels are integrated, as shown in FIG. 5. In this way, a lenticular lens passing through a column can be arranged for the column of pixels, which reduces the process accuracy, and the implementation can thus be achieved simply.

In the embodiment of the present invention, by adjusting the focal lengths of the vertical lenticular lens and the horizontal lenticular lens, either imaging in front of the screen or imaging at the rear of the screen can be achieved. The imaging position can be flexibly set according to actual needs. The following examples illustrate some specific implementations.

Figure 6:
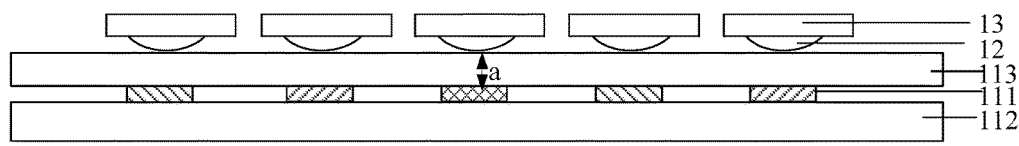
FIG. 6 is a structural schematic diagram of a flat display panel according to an embodiment of the invention.

In an implementation, optionally, as shown in FIG. 6, the flat display panel includes an upper substrate 113 and a lower substrate 112 arranged oppositely. The plurality of pixels 111 are located on the lower substrate 112. The lens group is located on a light exit surface of the upper substrate 113. An object distance of each pixel 111 for imaging is a thickness of the upper substrate 113 (indicated with a in FIG. 6).

Figure 7:
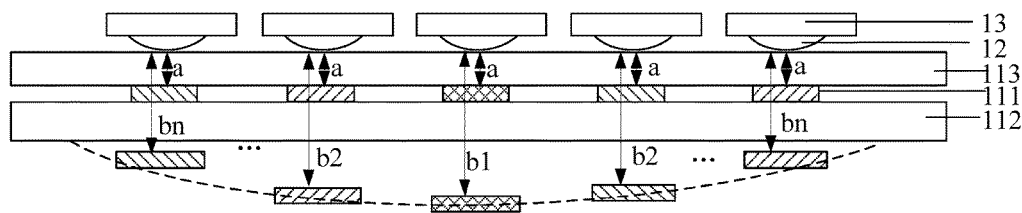
FIG. 7 is a schematic diagram of rear imaging according to an embodiment of the invention.

Based on the flat display panel of the above embodiment, as shown with the cross-sectional view in FIG. 7, in order to realize imaging at the rear of the screen, the image distance (indicated with b1 in FIG. 7) of the central pixel for imaging is the largest, and the image distance of the most marginal pixel for imaging is the smallest. Optionally, the focal length of each vertical lenticular lens is larger than the thickness of the upper substrate (i.e., the object distance of the corresponding pixel for imaging). In a row of vertical lenticular lenses, the focal length of the vertical lenticular lens increases gradually from the symmetry axis to a side edge. That is, the focal length gradually increases from f1 to fn.

Based on the virtual curved surface display panel shown in FIG. 7, the arch height H of the curved surface (shown by the dotted line in FIG. 7) to be formed is the largest image distance b1. If in a row of pixels there are M pixels from the central pixel to a side edge, the image distance of the nth pixel for imaging is $bn=b1-(n-1)*b1/M$.

Figure 8:
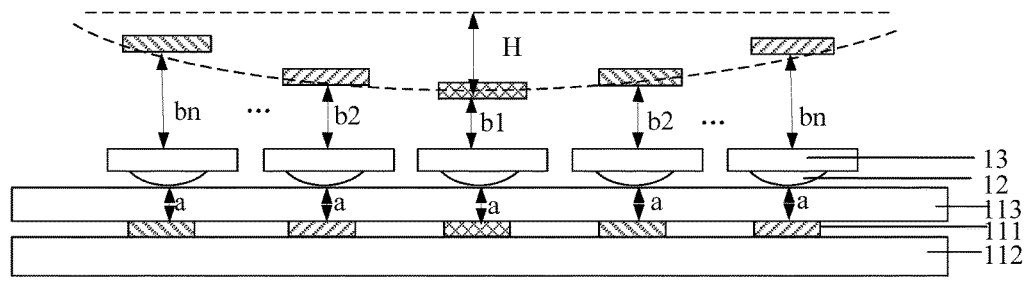
FIG. 8 is a schematic diagram of front imaging according to an embodiment of the invention.

Based on the flat display panel of the above embodiment, as shown with the cross-sectional view in FIG. 8, in order to realize imaging at the front of the screen (i.e., the light exit side of the screen), the image distance (indicated with b1 in FIG. 8) of the central pixel for imaging is the smallest, and the image distance of the most marginal pixel for imaging is the largest. Optionally, an object distance of a pixel for imaging is larger than the focal length of a corresponding vertical lenticular lens and less than twice the focal length of the corresponding vertical lenticular lens. In a row of vertical lenticular lenses, the focal length of the vertical lenticular lens increases gradually from the symmetry axis to a side edge. That is, the focal length gradually increases from f1 to fn.

Based on the virtual curved surface display panel shown in FIG. 8, the arch height of the curved surface (shown by the dotted line in FIG. 8) to be formed is H. If in a row of pixels there are M pixels from the central pixel to a side edge, the image distance of the nth pixel for imaging is $bn=b1+(n-1)*H/M$.

Figure 9:
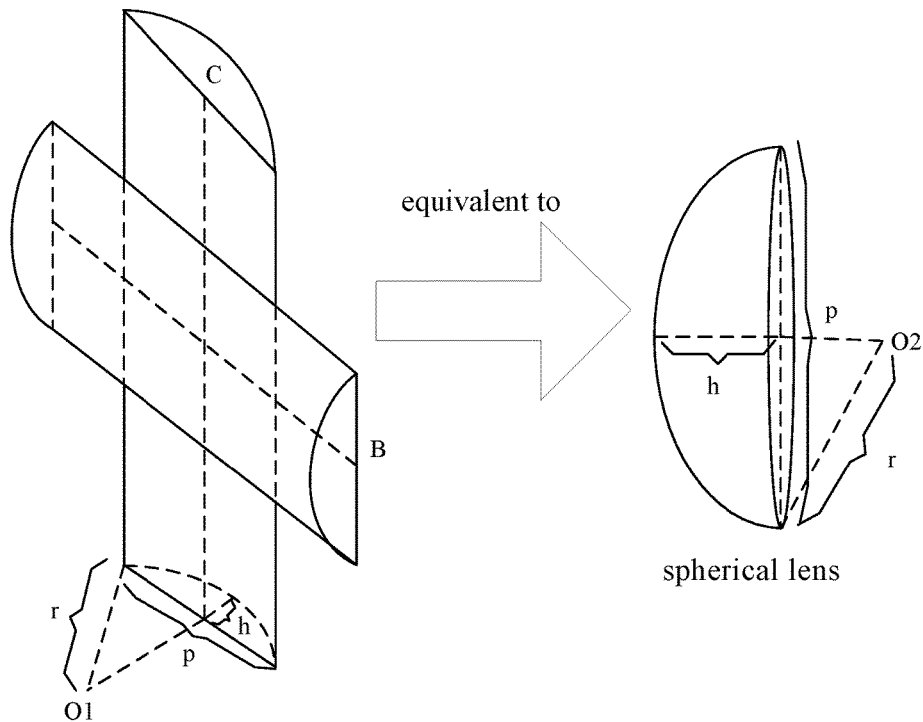
FIG. 9 is a schematic diagram showing parameters of a lenticular lens and a spherical lens according to an embodiment of the invention.

As shown in FIG. 9, in general, in addition to the focal length f, the main parameters of the lenticular lens include the refractive index n, the curvature radius r, the aperture p and the arch height h, where O1 is the center of the circle on the bottom of the cylinder corresponding to the lenticular lens. The main parameters of the equivalent spherical lens formed by two lenticular lenses fitted tightly and orthogonally with the same focal length also include the focal length f, the refractive index n, the curvature radius r, the aperture p and the arch height h, where O2 is the center of the sphere corresponding to the spherical lens.

In an implementation, according to the Gaussian formula $1/f=1/a+1/b$, the focal length f of the equivalent spherical lens for each pixel can be determined based on the object distance and image distance of each pixel. The focal length of the equivalent spherical lens is equal to the focal lengths of the vertical lenticular lens and the horizontal lenticular lens fitted tightly and orthogonally, the focal lengths of the vertical lenticular lens and the horizontal lenticular lens can thus be determined. Therefore, optionally, the focal length of the vertical lenticular lens is $f=ab/(a+b)$. a represents an object distance of a pixel corresponding to the vertical lenticular lens for imaging, and b represents an image distance of the pixel corresponding to the vertical lenticular lens for imaging. The parameters such as the refractive index n, the curvature radius r, the aperture p and the arch height h can be determined in conjunction with the focal length of the lenticular lenses in a column.

In an implementation, according to the formula of focal length of lens $f=r/(n-1)$, optionally, the curvature radius of the vertical lenticular lens is $r=ab(n-1)/(a+b)$. a represents an object distance of a pixel corresponding to the vertical lenticular lens for imaging, b represents an image distance of the pixel corresponding to the vertical lenticular lens for imaging, and n represents a refractive index of the vertical lenticular lens.

In general, the refractive index of the lens is related to its material. Accordingly, the curvature radius of the horizontal lenticular lens fitted tightly and orthogonally with the vertical lenticular lens is also applicable to the above formula. At this time, n represents the refractive index of the horizontal lenticular lens.

In an implementation, based on the geometric relationship shown in FIG. 9, optionally, the arch height of the horizontal lenticular lens is $h=r-\sqrt{r^2-(p/2)^2}$. p represents the aperture of the vertical lenticular lens. The aperture of the vertical lenticular lens is not less than the width of the corresponding pixel in the column direction.

Optionally, the aperture of the vertical lenticular lens is not less than the width of the corresponding pixel in the column direction. The width of the pixel in the column direction is the width of the row in which the pixel is located. In this way, it is ensured that the pixel can be covered.

Accordingly, the arch height of the horizontal lenticular lens fitted tightly and orthogonally with the vertical lenticular lens is also applicable to the above formula. At this time, p represents the aperture of the horizontal lenticular lens. The aperture of the horizontal lenticular lens is not less than the width of the corresponding pixel in the row direction. The width of the pixel in the row direction is the width of the column in which the pixel is located.

In an implementation, optionally, a refractive index of each horizontal lenticular lens is equal to a refractive index of a vertical lenticular lens fitted tightly and orthogonally with the horizontal lenticular lens. A curvature radius of each horizontal lenticular lens is equal to a curvature radius of a vertical lenticular lens fitted tightly and orthogonally with the horizontal lenticular lens. An arch height of each horizontal lenticular lens is equal to an arch height of a vertical lenticular lens fitted tightly and orthogonally with the horizontal lenticular lens. An aperture of each horizontal lenticular lens is equal to an aperture of a vertical lenticular lens fitted tightly and orthogonally with the horizontal lenticular lens.

In this embodiment, the parameters of the vertical lenticular lens such as the refractive index, curvature radius, arch height and aperture are respectively equal to those of the corresponding horizontal lenticular lens, the parameters of the equivalent spherical lens are also equal to those of the horizontal lenticular lens and the vertical lenticular lens, which makes the design simpler.

In the following, a specific structure is taken as an example, and a virtual curved surface display panel provided by the embodiment of the present invention is described in more detail.

Figure 10:
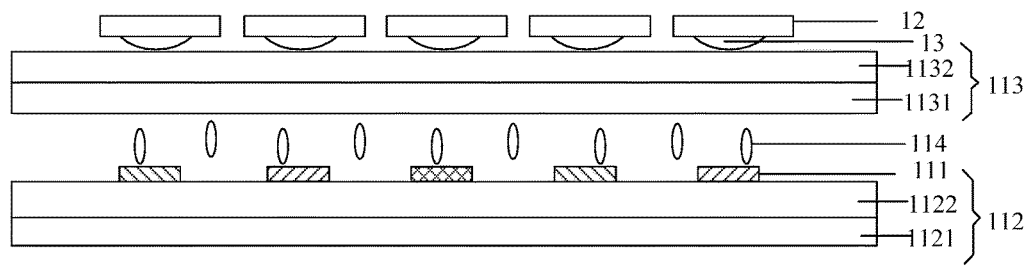
FIG. 10 is a structural schematic diagram of a virtual curved surface display panel according to yet another embodiment of the invention.

In this embodiment, the flat display panel is a liquid crystal display panel. As shown in FIG. 10, the flat display panel includes an upper substrate 113, a lower substrate 112, and a liquid crystal layer 114 located between the upper substrate 113 and the lower substrate 112. The lower substrate 112 includes a lower polarizer 1121 and an array substrate 1122. The upper substrate 113 includes a color film substrate 1131 and an upper polarizer 1132. The flat display panel also includes a plurality of pixels 111 arranged in a matrix.

The upper polarizer 1132 is provided with a lens group, which is attached to the liquid crystal display panel by adhesive. The lens group is used so that images of the plurality of pixels made by the lens group form a curved surface. In the present embodiment, based on the above mentioned structure, the object distance of each pixel for imaging is the sum of the thickness of the color film substrate 1131, the thickness of the upper polarizer 1132 and the thickness of the adhesive. If the image is imaged at the rear of the screen, the image distance of each pixel can refer to the embodiment of FIG. 7. If the image is imaged in front of the screen, the image distance of each pixel can refer to the embodiment of FIG. 8.

The lens group can apply the structure shown in FIG. 5. The lens group includes a plurality of sets of vertical lenticular lens 12 and horizontal lenticular lens 13 fitted tightly and orthogonally. The sets of vertical lenticular lens 12 and horizontal lenticular lens 13 are respectively located on a light exit side of the pixels 111. An overlapping region of each set of vertical lenticular lens 12 and horizontal lenticular lens 13 fitted tightly and orthogonally covers a corresponding pixel 111. In a column of vertical lenticular lenses 12 corresponding to a column of pixels 111, focal lengths of the respective vertical lenticular lenses 12 are equal. In a row of vertical lenticular lenses 12 corresponding to a row of pixels 111, focal lengths of the respective vertical lenticular lenses 12 are symmetrically distributed with a central pixel 111 as a symmetry axis (indicated with the dotted line A in FIG. 5), and focal lengths of the respective vertical lenticular lenses 12 located on the same side of the symmetry axis are not equal to each other. A column of vertical lenticular lenses corresponding to a column of pixels are formed integrally.

In each set of vertical lenticular lens 12 and horizontal lenticular lens fitted tightly and orthogonally, a focal length of the horizontal lenticular lens 13 is equal to a focal length of the vertical lenticular lens 12. A refractive index of each horizontal lenticular lens is equal to a refractive index of a vertical lenticular lens fitted tightly and orthogonally with the horizontal lenticular lens. A curvature radius of each horizontal lenticular lens is equal to a curvature radius of a vertical lenticular lens fitted tightly and orthogonally with the horizontal lenticular lens. An arch height of each horizontal lenticular lens is equal to an arch height of a vertical lenticular lens fitted tightly and orthogonally with the horizontal lenticular lens. An aperture of each horizontal lenticular lens is equal to an aperture of a vertical lenticular lens fitted tightly and orthogonally with the horizontal lenticular lens. An aperture of a vertical lenticular lens is larger than the long side of the pixel corresponding to the vertical lenticular lens, so as to ensure that the entire pixel is covered by the overlapping region of the vertical lenticular lens and the horizontal lenticular lens.

In this embodiment, both the refractive index of the horizontal lenticular lenses and the refractive index of the vertical lenticular lenses are 1.5. The parameters of the horizontal lenticular lenses and the vertical lenticular lenses such as the focal length, the arch height and the aperture can refer to the formulas in the above embodiments, which will not be repeated herein.

Based on the same concept, an embodiment of the invention further provides a display device including the virtual curved surface display panel according to any one of the above mentioned embodiments.

Figure 11:
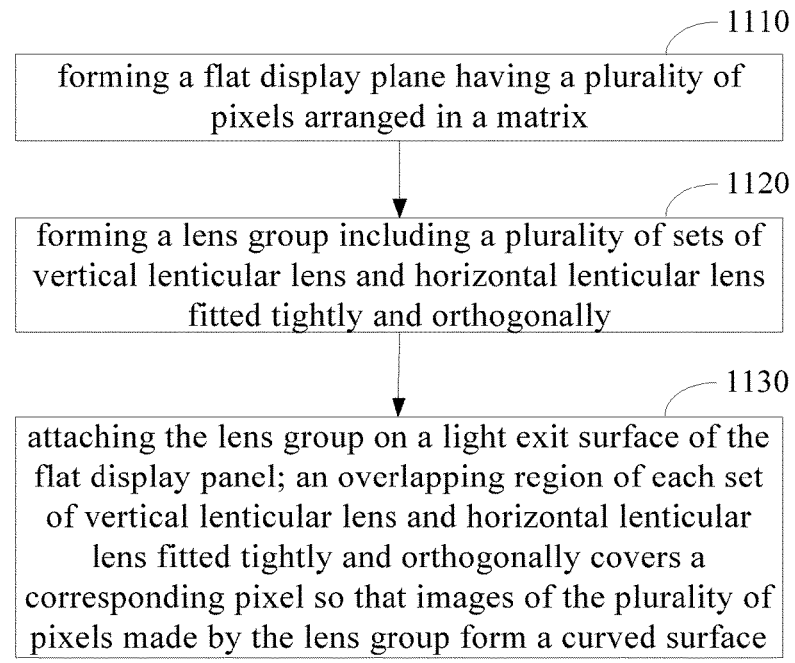
FIG. 11 is a flow chart of a method of manufacturing a virtual curved surface display panel according to an embodiment of the invention.

Based on the same concept, an embodiment of the invention further provides a method of manufacturing a virtual curved surface display panel. As shown in FIG. 11, the method at least includes the following steps.

Step 1110, forming a flat display plane having a plurality of pixels arranged in a matrix.

Step 1120, forming a lens group including a plurality of sets of vertical lenticular lens and horizontal lenticular lens fitted tightly and orthogonally; wherein in a column of vertical lenticular lenses corresponding to a column of pixels, focal lengths of the respective vertical lenticular lenses are equal; wherein in a row of vertical lenticular lenses corresponding to a row of pixels, focal lengths of the respective vertical lenticular lenses are symmetrically distributed with a central pixel as a symmetry axis, and focal lengths of the respective vertical lenticular lenses located on the same side of the symmetry axis are not equal to each other; and wherein in each set of vertical lenticular lens and horizontal lenticular lens fitted tightly and orthogonally, a focal length of the horizontal lenticular lens is equal to a focal length of the vertical lenticular lens.

Step 1130, attaching the lens group on a light exit surface of the flat display panel; wherein an overlapping region of each set of vertical lenticular lens and horizontal lenticular lens fitted tightly and orthogonally covers a corresponding pixel so that images of the plurality of pixels made by the lens group form a curved surface.

In the embodiment of the invention, a set of vertical lenticular lens and horizontal lenticular lens fitted tightly and orthogonally is arranged on a light exit surface of a pixel in the flat display panel, which forms an equivalent spherical lens. The focal lengths of the respective vertical lenticular lenses in a row corresponding to a row of pixels are symmetrically distributed with a central pixel as a symmetry axis, and focal lengths of the vertical lenticular lenses in the columns located on the same side of the symmetry axis are not equal to each other. Hence, the focal lengths of the equivalent spherical lenses are symmetrically distributed with a central pixel as a symmetry axis, and focal lengths of the equivalent spherical lenses in the columns located on the same side of the symmetry axis are not equal to each other. Therefore, the equivalent spherical lenses enable the images of the pixels to form a curved surface, thereby realizing virtual curved surface display. Compared with the prior art solution, it is unnecessary to perform a mechanical process to the flat display panel, thus there is no defect such as light leakage and color display abnormality in the flat display panel. In addition, the flexibility design for the flat panel display can also be reduced, and the implementation can thus be achieved simply.

Optionally, in the step 1110, forming a flat display plane having a plurality of pixels arranged in a matrix can includes the following steps.

Step 11, coating a whole layer of a lens imprinting plastic material on a first lens substrate and a second lens substrate respectively.

Step 12, imprinting a pattern of a plurality of vertical lenticular lenses on the first lens substrate coated with the lens imprinting plastic material by a first imprint mold, and imprinting a pattern of a plurality of horizontal lenticular lenses on the second lens substrate coated with the lens imprinting plastic material by a second imprint mold.

Figure 12:
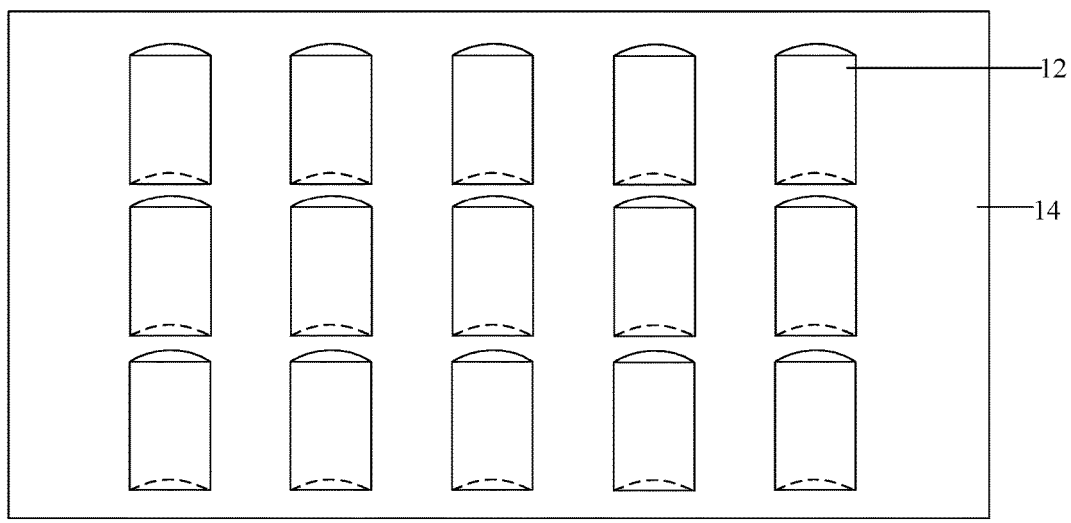
FIG. 12 is a structural schematic diagram of the imprinted vertical lenticular lenses according to an embodiment of the invention.
Figure 13:
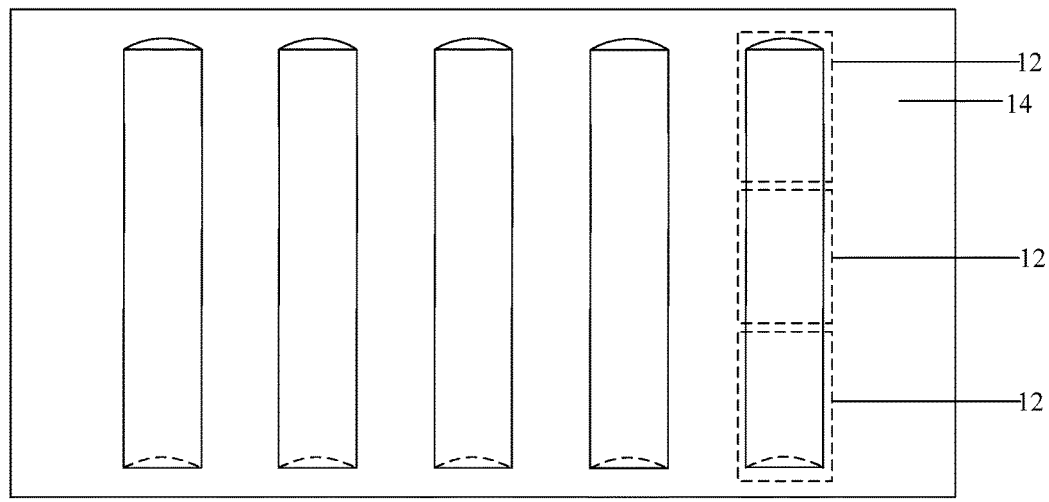
FIG. 13 is a structural schematic diagram of the imprinted vertical lenticular lenses according to another embodiment of the invention.
Figure 14:
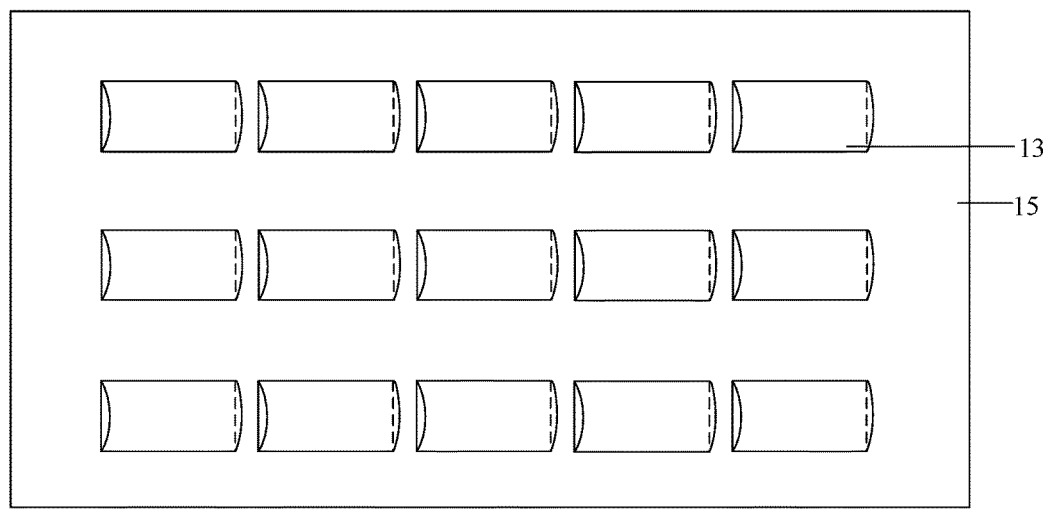
FIG. 14 is a structural schematic diagram of the imprinted horizontal lenticular lenses according to an embodiment of the invention.

In this step, the imprinted pattern of the vertical lenticular lenses can be a pattern shown in FIG. 12 or FIG. 13. A plurality of vertical lenticular lenses are imprinted on the first lens substrate 14. The imprinted pattern of the horizontal lenticular lenses is shown in FIG. 14. A plurality of horizontal lenticular lenses are imprinted on the second lens substrate 15.

Step 13, performing a curing process to the first lens substrate imprinted with the pattern of the plurality of vertical lenticular lenses to form a plurality of vertical lenticular lenses, and performing a curing process to the second lens substrate imprinted with the pattern of the plurality of horizontal lenticular lenses to form a plurality of horizontal lenticular lenses.

Step 14, performing a fitting process to the first lens substrate formed with the plurality of vertical lenticular lenses and the second lens substrate formed with the plurality of horizontal lenticular lenses so that each horizontal lenticular lens is fitted to a corresponding vertical lenticular lens tightly and orthogonally.

Optionally, the method further includes: prefabricating the first imprint mold for forming the plurality of vertical lenticular lenses and the second imprint mold for forming the plurality of horizontal lenticular lenses.

Optionally, the flat display panel includes an upper substrate and a lower substrate arranged oppositely. The plurality of pixels are located on the lower substrate. The lens group is located on a light exit surface of the upper substrate. An object distance of each pixel for imaging is a thickness of the upper substrate. The step of prefabricating the first imprint mold for forming the plurality of vertical lenticular lenses and the second imprint mold for forming the plurality of horizontal lenticular lenses includes: step 21, determining a curved surface to be formed with the images of the plurality of pixels; step 22, determining image distances of the plurality of pixels based on the curved surface; step 23, determining focal lengths of the plurality of pixels based on the image distances of the plurality of pixels and the thickness of the upper substrate; step 24, determining focal lengths of the respective sets of vertical lenticular lens and the horizontal lenticular lens fitted tightly and orthogonally and covering corresponding pixels based on the focal lengths of the plurality of pixels; and step 25, fabricating the first imprint mold based on the determined focal lengths of the respective vertical lenticular lenses, and fabricating the second imprint mold based on the determined focal lengths of the respective horizontal lenticular lenses.

In particular, the step 25 can includes: determining the curvature radius of each vertical lenticular lens based on the refractive index of the lens imprinting plastic material and the determined focal length of each vertical lenticular lens; determining the aperture of each vertical lenticular lens based on the width of each pixel in the column direction; determining the arch height of each vertical lenticular lens based on the aperture and the curvature radius; fabricating the first imprint mold based on the determined arch height, curvature radius and aperture of each vertical lenticular lens; determining the curvature radius of each horizontal lens based on the refractive index of the lens imprinting plastic material and the determined focal length of each horizontal lenticular lens; determining the aperture of each horizontal lenticular lens based on the width of each pixel in the row direction; determining the arch height of each horizontal lenticular lens based on the aperture and the curvature radius; and fabricating the second imprint mold based on the determined arch height, curvature radius and aperture of each horizontal lenticular lens.

In the virtual curved surface display panel, method of manufacturing the same and display device provided by the embodiment of the present invention, a set of vertical lenticular lens and horizontal lenticular lens fitted tightly and orthogonally is arranged on a light exit surface of a pixel in the flat display panel, which forms an equivalent spherical lens. The focal lengths of the respective vertical lenticular lenses in a row corresponding to a row of pixels are symmetrically distributed with a central pixel as a symmetry axis, and focal lengths of the vertical lenticular lenses in the columns located on the same side of the symmetry axis are not equal to each other. Hence, the focal lengths of the equivalent spherical lenses are symmetrically distributed with a central pixel as a symmetry axis, and focal lengths of the equivalent spherical lenses in the columns located on the same side of the symmetry axis are not equal to each other. Therefore, the equivalent spherical lenses enable the images of the pixels to form a curved surface, thereby realizing virtual curved surface display. Compared with the prior art solution, it is unnecessary to perform a mechanical process to the flat display panel, thus there is no defect such as light leakage and color display abnormality in the flat display panel. In addition, the flexibility design for the flat panel display can also be reduced, and the implementation can thus be achieved simply.

Based on the same concept, an embodiment of the invention further provides a display method using the virtual curved surface display panel according to any one of the above mentioned embodiments. The display method includes: imaging the plurality of pixels using the plurality of sets of vertical lenticular lens and horizontal lenticular lens fitted tightly and orthogonally; wherein images of the plurality of pixels form a curved surface.

While optional embodiments of the present invention have been described, those skilled in the art will be able to make further changes and modifications to these embodiments upon the knowledge of the basic inventive concepts. Accordingly, it is intended that the appended claims be interpreted as including all alterations and modifications that fall within the scope of the invention.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A virtual curved surface display panel, comprising: a flat display panel having a plurality of pixels arranged in a matrix, and a lens group arranged on a light exit surface of the flat display panel; wherein images of the plurality of pixels made by the lens group form a curved surface; wherein the lens group comprises:
a plurality of sets of vertical lenticular lens and horizontal lenticular lens fitted tightly and orthogonally one-to-one corresponding to the plurality of pixels, an overlapping region of each set of vertical lenticular lens and horizontal lenticular lens fitted tightly and orthogonally covering a corresponding pixel;
wherein in a column of vertical lenticular lenses corresponding to a column of pixels, focal lengths of the respective vertical lenticular lenses are equal;
wherein in a row of vertical lenticular lenses corresponding to a row of pixels, focal lengths of the respective vertical lenticular lenses are symmetrically distributed with a central pixel as a symmetry axis, and focal lengths of the respective vertical lenticular lenses located on the same side of the symmetry axis are not equal to each other;
and wherein in each set of vertical lenticular lens and horizontal lenticular lens fitted tightly and orthogonally, a focal length of the horizontal lenticular lens is equal to a focal length of the vertical lenticular lens.

2. The virtual curved surface display panel according to claim 1, wherein a column of vertical lenticular lenses corresponding to a column of pixels are formed integrally.

3. The virtual curved surface display panel according to claim 1, wherein the focal length of each vertical lenticular lens is larger than an object distance of the corresponding pixel for imaging; and wherein in a row of vertical lenticular lenses, the focal length of the vertical lenticular lens increases gradually from the symmetry axis to a side edge.

4. The virtual curved surface display panel according to claim 1, wherein an object distance of a pixel for imaging is larger than the focal length of a corresponding vertical lenticular lens and less than twice the focal length of the corresponding vertical lenticular lens; and wherein in a row of vertical lenticular lenses, the focal length of the vertical lenticular lens increases gradually from the symmetry axis to a side edge.

5. The virtual curved surface display panel according to claim 1, wherein an aperture of a vertical lenticular lens is not less than a width of the corresponding pixel in the column direction, or
an aperture of a horizontal lenticular lens is not less than a width of the corresponding pixel in the row direction.

6. The virtual curved surface display panel according claim 1, wherein a refractive index of each horizontal lenticular lens is equal to a refractive index of a vertical lenticular lens fitted tightly and orthogonally with the horizontal lenticular lens;
wherein a curvature radius of each horizontal lenticular lens is equal to a curvature radius of a vertical lenticular lens fitted tightly and orthogonally with the horizontal lenticular lens;
wherein an arch height of each horizontal lenticular lens is equal to an arch height of a vertical lenticular lens fitted tightly and orthogonally with the horizontal lenticular lens;
and wherein an aperture of each horizontal lenticular lens is equal to an aperture of a vertical lenticular lens fitted tightly and orthogonally with the horizontal lenticular lens.

7. The virtual curved surface display panel according to claim 6, wherein the focal length of the vertical lenticular lens is $f=ab/(a+b)$; wherein a represents an object distance of a pixel corresponding to the vertical lenticular lens for imaging, and b represents an image distance of the pixel corresponding to the vertical lenticular lens for imaging.

8. The virtual curved surface display panel according to claim 6, wherein the curvature radius of the vertical lenticular lens is $r=ab(n-1)/(a+b)$; wherein a represents an object distance of a pixel corresponding to the vertical lenticular lens for imaging, b represents an image distance of the pixel corresponding to the vertical lenticular lens for imaging, and n represents a refractive index of the vertical lenticular lens.

9. The virtual curved surface display panel according to claim 6, wherein the arch height of the horizontal lenticular lens is $h=r-\sqrt{r^2-(p/2)^2}$; wherein r represents the curvature radius of the vertical lenticular lens, and p represents the aperture of the vertical lenticular lens.

10. A display device comprising the virtual curved surface display panel according to claim 1.

11. The display device according to claim 10, wherein a column of vertical lenticular lenses corresponding to a column of pixels are formed integrally.

12. The display device according to claim 10, wherein the focal length of each vertical lenticular lens is larger than an object distance of the corresponding pixel for imaging; and wherein in a row of vertical lenticular lenses, the focal length of the vertical lenticular lens increases gradually from the symmetry axis to a side edge.

13. The display device according to claim 10, wherein an object distance of a pixel for imaging is larger than the focal length of a corresponding vertical lenticular lens and less than twice the focal length of the corresponding vertical lenticular lens; and wherein in a row of vertical lenticular lenses, the focal length of the vertical lenticular lens increases gradually from the symmetry axis to a side edge.

14. The display device according to claim 10, wherein an aperture of a vertical lenticular lens is not less than a width of the corresponding pixel in the column direction, or
an aperture of a horizontal lenticular lens is not less than a width of the corresponding pixel in the row direction.

15. The display device according to claim 10, wherein a refractive index of each horizontal lenticular lens is equal to a refractive index of a vertical lenticular lens fitted tightly and orthogonally with the horizontal lenticular lens;
wherein a curvature radius of each horizontal lenticular lens is equal to a curvature radius of a vertical lenticular lens fitted tightly and orthogonally with the horizontal lenticular lens;
wherein an arch height of each horizontal lenticular lens is equal to an arch height of a vertical lenticular lens fitted tightly and orthogonally with the horizontal lenticular lens;
and wherein an aperture of each horizontal lenticular lens is equal to an aperture of a vertical lenticular lens fitted tightly and orthogonally with the horizontal lenticular lens.

16. A display method using the virtual curved surface display panel according to claim 1, comprising:
imaging the plurality of pixels using the plurality of sets of vertical lenticular lens and horizontal lenticular lens fitted tightly and orthogonally; wherein images of the plurality of pixels form a curved surface.

17. A method of manufacturing a virtual curved surface display panel, comprising:

forming a flat display panel having a plurality of pixels arranged in a matrix;

forming a lens group comprising a plurality of sets of vertical lenticular lens and horizontal lenticular lens fitted tightly and orthogonally; wherein in a column of vertical lenticular lenses corresponding to a column of pixels, focal lengths of the respective vertical lenticular lenses are equal; wherein in a row of vertical lenticular lenses corresponding to a row of pixels, focal lengths of the respective vertical lenticular lenses are symmetrically distributed with a central pixel as a symmetry axis, and focal lengths of the respective vertical lenticular lenses located on the same side of the symmetry axis are not equal to each other; and wherein in each set of vertical lenticular lens and horizontal lenticular lens fitted tightly and orthogonally, a focal length of the horizontal lenticular lens is equal to a focal length of the vertical lenticular lens; and attaching the lens group on a light exit surface of the flat display panel; wherein an overlapping region of each set of vertical lenticular lens and horizontal lenticular lens fitted tightly and orthogonally covers a corresponding pixel so that images of the plurality of pixels made by the lens group form a curved surface.

18. The method according to claim 17, wherein forming a lens group comprising a plurality of sets of vertical lenticular lens and horizontal lenticular lens fitted tightly and orthogonally comprises:

coating a whole layer of a lens imprinting plastic material on a first lens substrate and a second lens substrate respectively;

imprinting a pattern of a plurality of vertical lenticular lenses on the first lens substrate coated with the lens imprinting plastic material by a first imprint mold, and imprinting a pattern of a plurality of horizontal lenticular lenses on the second lens substrate coated with the lens imprinting plastic material by a second imprint mold;

performing a curing process to the first lens substrate imprinted with the pattern of the plurality of vertical lenticular lenses to form a plurality of vertical lenticular lenses, and performing a curing process to the second lens substrate imprinted with the pattern of the plurality of horizontal lenticular lenses to form a plurality of horizontal lenticular lenses;

performing a fitting process to the first lens substrate formed with the plurality of vertical lenticular lenses and the second lens substrate formed with the plurality of horizontal lenticular lenses so that each horizontal lenticular lens is fitted to a corresponding vertical lenticular lens tightly and orthogonally.

19. The method according to claim 18, further comprising: prefabricating the first imprint mold for forming the plurality of vertical lenticular lenses and the second imprint mold for forming the plurality of horizontal lenticular lenses.

20. The method according to claim 19, wherein the flat display panel comprises an upper substrate and a lower substrate arranged oppositely; the plurality of pixels is located on the lower substrate; the lens group is located on a light exit surface of the upper substrate;

wherein an object distance of each pixel for imaging is a thickness of the upper substrate;

wherein prefabricating the first imprint mold for forming the plurality of vertical lenticular lenses and the second imprint mold for forming the plurality of horizontal lenticular lenses comprises:

determining a curved surface to be formed with the images of the plurality of pixels;

determining image distances of the plurality of pixels based on the curved surface;

determining focal lengths of the plurality of pixels based on the image distances of the plurality of pixels and the thickness of the upper substrate;

determining focal lengths of the respective sets of vertical lenticular lens and the horizontal lenticular lens fitted tightly and orthogonally and covering corresponding pixels based on the focal lengths of the plurality of pixels;

fabricating the first imprint mold based on the determined focal lengths of the respective vertical lenticular lenses, and fabricating the second imprint mold based on the determined focal lengths of the respective horizontal lenticular lenses.

\* \* \* \* \*